(No Model.)

J. W. HYATT.
Process of and Apparatus for Molding Celluloid, Hard Rubber, Bonselate, and Analogous Plastic Material.
No. 239,791. Patented April 5, 1881.

Witnesses:
F. Walter Fowler,
Chas. C. Gill.

Inventor:
John W. Hyatt,
by his Atty's,
Cox and Cox.

UNITED STATES PATENT OFFICE.

JOHN W. HYATT, OF NEWARK, NEW JERSEY.

PROCESS OF AND APPARATUS FOR MOLDING CELLULOID, HARD RUBBER, BONSILATE, AND ANALOGOUS PLASTIC MATERIALS.

SPECIFICATION forming part of Letters Patent No. 239,791, dated April 5, 1881.

Application filed March 12, 1881. (No model.)

*To all whom it may concern:*

Be it known that I, JOHN W. HYATT, of Newark, in the county of Essex and State of New Jersey, have invented a new and useful Improvement in Process of and Apparatus for Molding Celluloid, Hard Rubber, Bonsilate, and Analogous Plastic Materials, of which the following is a specification, reference being had to the accompanying drawings.

The invention relates to an improved process and apparatus for molding plastic material, the object being to provide a means whereby a high degree of heat and pressure may be evenly and continuously applied without danger of a material variation of either.

The novelty of the process consists in the application of the heat and pressure through the medium of a liquid, whereby the employment of dies or molds of inconsiderable strength, and even the use in lieu of molds or dies of pliable or elastic bags, protectors, or coverings, is rendered practicable, as hereinafter more fully set forth.

In practicing the invention I prefer to use water; but other liquids may be employed, if desired, with good results.

The invention is especially applicable to the treatment of celluloid, hard rubber, bonsilate, and analogous plastic compositions.

Figure 1:
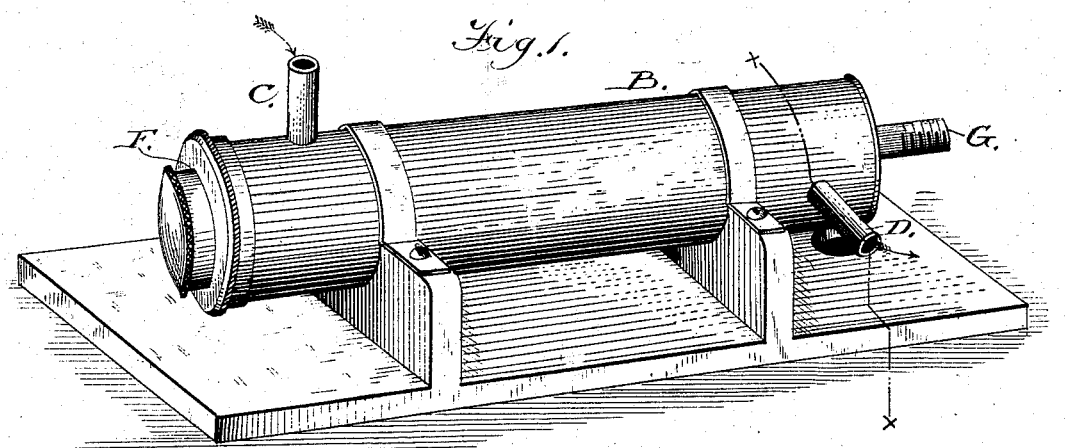
Figure 2:
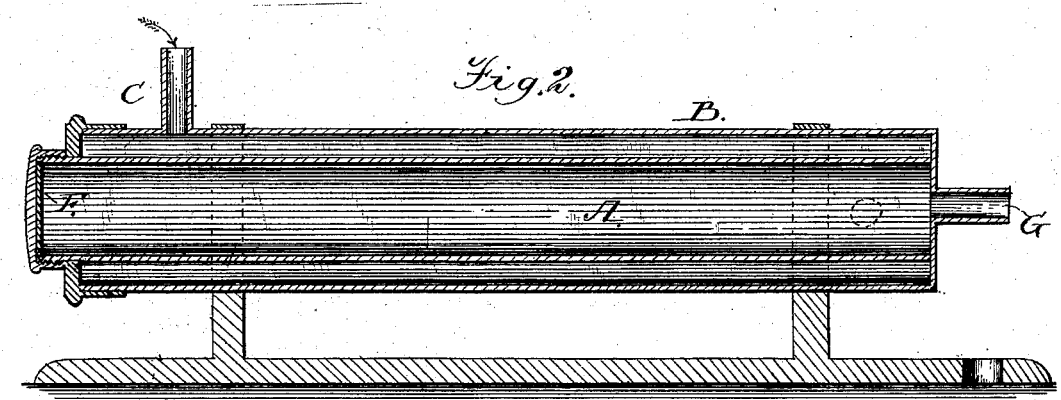
Figure 3:
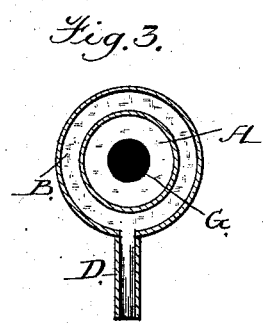

Referring to the accompanying drawings, Figure 1 is a perspective view of an apparatus containing an embodiment of the elements of the invention. Fig. 2 is a central vertical longitudinal section of same, and Fig. 3 is a central vertical transverse section of same.

A denotes a vessel of suitable strength and shape adapted to receive the molds or articles, according to circumstances. It is surrounded by a steam-jacket, B, into which steam is admitted through the pipe C and permitted to escape, when condensed, through the pipe D, or otherwise introduced and discharged, as may be convenient.

One end of the vessel A is provided with an appropriate opening, F, through which the dies or molds may be passed into the vessel A at pleasure. At the other end of the vessel is the pipe G, through which the water or other liquid is conveyed into the vessel and the pressure applied, as hereinafter recited.

Where dies or molds proper are used the material is introduced and the molds placed in the vessel, when the opening F is properly closed. The water or other liquid is then admitted and the steam let into the space inclosed by the jacket B, the two being introduced either contemporaneously or successively, as may be desired. The heat is carried to such a point as may be preferred, when the hydraulic pressure is applied, in any convenient manner, through the pipe G, the heat and pressure being adapted to the requirements of the case and being continued under such conditions as may be necessary. It will be seen that by these means a perfectly even pressure and an unvarying degree of heat are accomplished, and both the heat and pressure will be precisely the same upon all parts of the mold or article, so that the result is a very satisfactory one.

The fact that the pressure of the liquid is the same upon all parts of the dies makes it unnecessary to provide a die of as great strength as is customary where the pressure is applied in the usual way. Thus I have found that dies or molds struck up from thin sheets of metal may be used with perfectly satisfactory results.

In many instances I propose to employ a flexible or elastic bag or protector, dispensing entirely with a mold or die proper. In practicing this branch of my process I first give the material to be treated the desired form or configuration by pressing it in molds or dies sufficiently to compact the material, so that it can be handled without attempting to effectually solidify it. I then insert the article in a bag or protector of rubber or other elastic material, or in any other covering or envelope which will conform itself to the shape of the article and serve to protect it from the action of the liquid, and then proceed as where a mold or die proper is used, as hereinbefore set forth.

After the heat and pressure have been applied, as may be desired, the steam in the jacket may be cut off and permitted to escape, and water or some other cooling agent introduced, whereby the molds or articles in the vessel A may be rapidly or slowly cooled at the pleasure of the operator; or the water may be drawn off from the vessel and other means of cooling employed, according to circumstances.

The amount of pressure employed will be from two thousand to four thousand pounds or upward to the square inch, according to the nature of the material to be molded, the inner and outer pipes being made sufficiently strong to withstand the pressure.

Water has been employed heretofore as a means of communicating pressure. For instance, Letters Patent No. 56,807 describe a method of forging metals, in which the piece of metal is placed in a chamber filled with water, the only inlet to the chamber being a small vent or aperture. A metallic punch is then placed in (completely filling) the vent or aperture, and subjected to percussive blows from a hammer, which has the effect of communicating, through the water, the action of the hammer to all parts of the article at one time. Brass and wrought-iron cannon are illustrations of the application of this idea.

In the manufacture of water-proof tubing or hose, also, the application of pressure through the medium of a liquid has been practiced. This process consists in lining and coating a woven tube with india-rubber combined with sulphur. Into a woven tube has been placed a tube of somewhat smaller size, made of india-rubber composition suitable for vulcanizing. This inner tube has then been expanded by fluid-pressure. While the tube is distending a strip of india-rubber composition is lapped around the hose and caused to adhere thereto around carefully-made joints. The vulcanizing process has been then effected while the hose is kept distended by fluid-pressure. The column of fluid forms a core around which the hose is constructed.

I do not limit my claim to the apparatus herein described; nor do I confine myself in constructing the dies or bags or protectors to any particular materials; but

What I claim as new, and desire to secure by Letters Patent, is—

1. The within-described process of molding plastic material, which consists in immersing the molds or dies containing the material in liquid contained in a suitable vessel and applying pressure to the liquid, substantially as described.

2. The within-described process of molding plastic material, which consists in immersing the molds or dies containing the material in liquid contained in a suitable vessel and applying heat and pressure to the liquid, substantially as described.

3. The within-described process of molding plastic material, which consists in immersing the dies containing the material in liquid contained in a vessel inclosed by a steam-jacket and applying pressure to the liquid while the heat is applied in the form of steam within the jacket surrounding the vessel, substantially as described.

4. The apparatus herein described, consisting of a vessel, A, having an opening, D, and pipe G, the vessel being inclosed by a jacket having supply and delivery pipes, substantially as described.

5. The process herein described, of forming articles of plastic material, which consists in giving the material the desired form by compacting it in molds sufficiently to give it such consistency that it may be handled without affecting its shape, and then subjecting it to pressure delivered through the medium of a liquid, the article being protected against the liquid by means of a bag or otherwise, substantially as set forth.

6. The process herein described of forming articles of plastic material, which consists in giving the material the desired form by compacting it in molds sufficiently to give it such consistency that it may be handled without affecting its shape, and then subjecting it to heat and pressure while immersed in a liquid, the article being protected against the liquid by means of a bag or otherwise, substantially as set forth.

In testimony that I claim the foregoing improvement in process and apparatus for molding plastic material, as above described, I have hereunto set my hand this 30th day of April, 1880.

JOHN W. HYATT.

Witnesses:
ABRAHAM MANNERS,
J. WILLIAM FORCE.